United States Patent [19]

Yamada et al.

[11] Patent Number: 4,517,601
[45] Date of Patent: May 14, 1985

[54] POWER-RESPONSIVE GHOST CANCELLING SYSTEM

[75] Inventors: Hisafumi Yamada, Tokyo; Junya Saito, Wakou; Ichiro Tsutsui, Tokyo, all of Japan

[73] Assignee: Sony Corporation, Tokyo, Japan

[21] Appl. No.: 472,748

[22] Filed: Mar. 7, 1983

[30] Foreign Application Priority Data

Mar. 9, 1982 [JP] Japan ................... 57-36967

[51] Int. Cl.³ .............................. H04N 5/21
[52] U.S. Cl. .................... 358/167; 358/905
[58] Field of Search ............. 358/905, 167, 29, 228

[56] References Cited

U.S. PATENT DOCUMENTS 4,127,874 11/1978 Iwasawa et al. ................ 358/167
4,344,089 8/1982 Utsunomiya et al. ........... 358/905
4,357,631 11/1982 Utsunomiya et al. ........... 358/905

Primary Examiner—John C. Martin
Assistant Examiner—E. Anne Toth
Attorney, Agent, or Firm—Hill, Van Santen, Steadman & Simpson

[57] ABSTRACT

A ghost cancelling system having a transversal filter including a weighting circuit and a memory, a power responsive circuit for detecting the time when a power switch is turned on, and an activating circuit connected between the power responsive circuit and the storage capacitor for charging the latter during a predetermined period when the power switch is turned on.

7 Claims, 8 Drawing Figures

FIG. 2
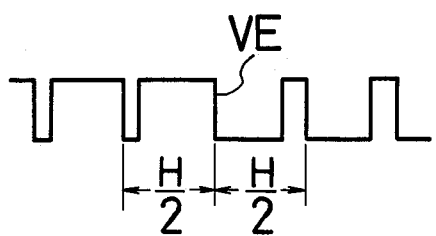
FIG. 3A
FIG. 3B
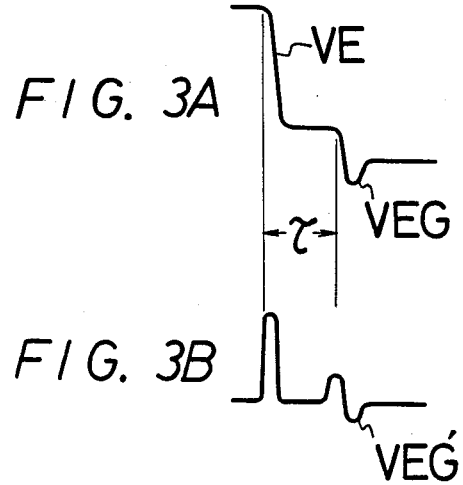
FIG. 5
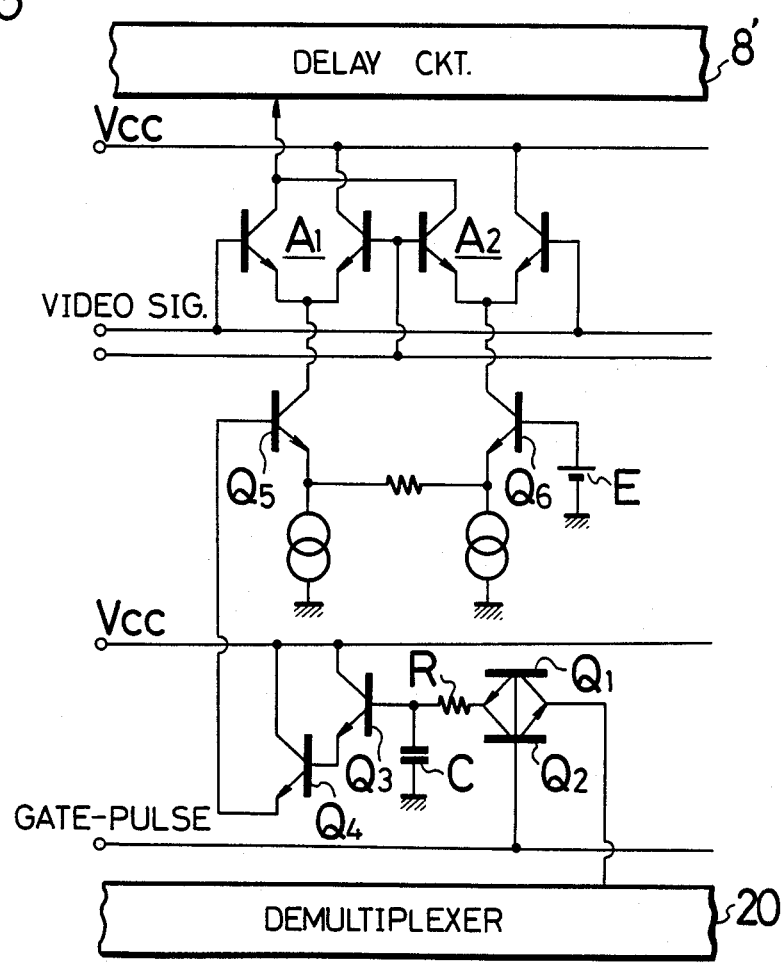

POWER-RESPONSIVE GHOST CANCELLING SYSTEM

BACKGROUND OF THE INVENTION

1. Field of the Invention

This invention relates generally to ghost cancelling systems for cancelling out a ghost signal at a video signal stage and more particularly is directed to a ghost cancelling system capable of immediately activating its operation when powered.

2. Description of the Prior Art

FIG. 1 schematically shows an example of a prior art ghost cancelling system. In FIG. 1, a video signal received by an antenna 1 is supplied through a tuner 2 and a video intermediate frequency (VIF) amplifier 3 to a video detector circuit 4 which then detects the video signal. This video signal is supplied through a delay circuit 5 with a delay time equal to an eliminating period of pre-ghost to a compounder or subtracter 6 which is also supplied with a ghost cancelling signal imitating the ghost and derived from a transversal filter as will be described hereinbelow and from which the video signal with ghosts cancelled out is delivered to an output terminal 7.

The video signal derived from the video detector circuit 4 is further supplied to a delay circuit 8 which forms a part of the transversal filter. In this delay circuit 8, delay elements, each of which takes a sampling period (for example, 10 nano seconds) as a unit of delay, are connected in plural stages (n number) to establish a delay time equal to the eliminating period of the pre-ghost and, n taps are led out from the respective stages. The signals from these n taps are respectively supplied to weighting circuits, $9_1, 9_2, \ldots 9_n$ each of which is formed of a multiplier.

The signal from the last stage of the delay circuit 8 is supplied to a terminal $10_f$ of a mode switch 10, and the output signal from the compounder or subtracter 6 is supplied to the other terminal $10_b$ of the mode switch 10. The signal derived from this mode switch 10 is supplied to a delay circuit 11. This delay circuit 11 is formed of delay elements, each delay element taking a sampling period as a unit delay time connected in plural stages (m number) to have a delay time equal to an eliminating period of delay ghost and m taps are led out from the respective stages thereof. The signals from these m taps are respectively supplied to weighting circuits, $12_1, 12_2, \ldots 12_m$, each of which is formed of a multiplier.

The video signal from the compounder or subtracter 6 is supplied to a subtracting circuit 13. Further, the video signal from the delay circuit 5 is supplied to a synchronizing separator circuit 14 and the separated vertical synchronizing signal therefrom is fed through a standard wave forming circuit 15 to a low-pass filter 16 in which is formed a standard waveform approximate to a step-waveform of a rising edge VE of the vertical synchronizing signal. This standard waveform is supplied to the subtracting circuit 13.

The signal from this subtracting circuit 13 is supplied to a differentiation circuit 17 which then detects a ghost level of that signal.

As is well known in the prior art, for the ghost level detecting signal, there is employed such a signal that is contained in a standard television signal and that is not affected by other signals during the period as long as possible, for example, the vertical synchronizing signal.

That is, as shown in FIG. 2, during the periods between the rising edge VE of the vertical synchronizing signal and $\pm \frac{1}{2}H$ (H is the horizontal period) before and after the rising edge VE, the vertical synchronizing signal is not affected by other signals. Therefore, the aforesaid standard wave is subtracted from the signal in this period and the subtracted signal is subjected to the differentiation and thereby a weighting function is detected.

It is known in the art that when there is contained in the RF stage a ghost with the phase difference $\phi$ of 45° from a desired signal and with a delay time $\tau(\phi = \omega_c \tau)$, where $\omega_c$ is the video carrier angular frequency in the high frequency stage), the ghost of the rising edge VE of the vertical synchronizing signal becomes such a waveform shown by reference letter VEG in FIG. 3A. Whereas, if this signal is differentiated and inverted in polarity, a ghost level detecting signal with a differentiation waveform shown by reference letter VEG' in FIG. 3B is provided. This differentiation waveform can approximately be regarded as an impulse response of the ghost.

Turning back to FIG. 1, the ghost level detecting signal of the differentiation waveform appearing from the differentiation circuit 17 is supplied through an amplifier 18 to demultiplexers 19 and 20 connected in series. The demultiplexers 19 and 20 each have such a construction similar to the delay circuits 8 and 11 in which delay elements, each of which takes a sampling period as a unit of delay time, are connected in plural stages and m and n taps are led out from the respective stages thereof. The outputs of these m and n taps are respectively supplied to switching circuits, $21_1, 21_2, \ldots 21_n$ and $22_1, 22_2, \ldots 22_m$.

The vertical synchronizing signal from the synchronizing separator circuit 14 is fed to a gate pulse generator 23 which then generates a gate pulse having a pulse timing corresponding to a falling edge of the ghost detecting period and having an interval of, for example, 100 nano seconds. By this gate pulse, the switching circuits, $21_1$ to $22_m$ are turned on, respectively.

The signals from these switching circuits, $21_1$ to $22_m$ are respectively supplied to memory circuits, $24_1, 24_2, \ldots 24_n$ and $25_1, 25_2, \ldots 25_m$, each of which is formed of an accumulative adder. The signals derived from the memory circuits, $24_1$ to $25_m$ are respectively supplied to the weighting circuits, $9_1$ to $9_n$ and $12_1$ to $12_m$.

The outputs of these weighting circuits, $9_1$ to $9_n$ and $12_1$ to $12_m$ are added together in an adding circuit 26 to form a ghost cancelling signal. This ghost cancelling signal is supplied to the compounder or subtracter 6.

As described above, the delay circuits 8 and 11, the weighting circuits, $9_1$ to $9_n$ and $12_1$ to $12_m$ and the adding circuit 26 constitute the transversal filter and thereby the ghost is cancelled out. In this case, even after the deformation of the waveform in the periods between the rising edge of a certain vertical synchronizing signal and the $\pm \frac{1}{2}H$ before and after the foregoing rising edge is detected and then a weighting function is decided, if there still remains a ghost, in order to detect such remaining ghost and to reduce the same, the memory circuits, $24_1$ to $25_m$ are respectively formed of analog accumulative adders.

The on-and-off operation of the mode switch 10 enables the delay ghost cancelling circuit to be selectively changed from the feedforward mode to the feedback mode and vice versa.

While FIG. 1 shows such a case where a so-called output-adding type transversal filter is employed, FIG. 4 shows another prior art example which employs a so-called input-adding type transversal filter to cancel out a ghost. In FIG. 4, like parts corresponding to those of FIG. 1 are marked with the same references and they will not be described in detail.

As shown in FIG. 4, the video signal derived from the video detector circuit 4 is supplied to the weighting circuits, $9_1$ to $9_n$ and the signals from these weighting circuits, $9_1$ to $9_n$ are respectively supplied to input terminals of a delay circuit 8'. This delay circuit 8' consists of delay elements, each of which takes a sampling period as a unit connected in n stages and n input terminals provided at each stage between adjacent ones.

The signals at the input and output sides of the compounder or subtracter 6 are supplied to terminals, $10_f'$ and $10_b'$ of a mode switch 10'. The signal from this mode switch 10' is supplied to the weighting circuits, $12_1$ to $12_m$ and the signals from these weighting circuits, $12_1$ to $12_m$ are respectively supplied to input terminals of a delay circuit 11'. This delay circuit 11' consists of delay elements each delay element having a sampling period as a unit and the circuit 11' consisits of m stages and m input terminals provided at each stage between adjacent ones.

The signals respectively derived from the ends of these delay circuits 8' and 11' are added together in an adding circuit 26' to form a ghost cancelling signal. This ghost cancelling signal is supplied to the compounder or the subtracter 6.

Even with this circuit arrangement of FIG. 4, it is well-known in the prior art that, similarly to the ghost cancelling circuit employing the aforesaid output-adding type transversal filter, the ghost signal can be cancelled out, too.

Moreover, it is well-known in the prior art that, in the aforesaid ghost cancelling circuits shown in FIGS. 1 and 4, instead of the differentiation circuit 17, the differences between the neighboring two outputs of the memory circuits $24_1$ to $24_n$ and $25_1$ to $25_m$ are provided to produce difference outputs and then the difference outputs are respectively supplied to the weighting circuits, $9_1$ to $9_n$ and $12_1$ to $12_m$.

Furthermore, it is also well-known in the prior art as, for example, disclosed in U.S. Pat. No. 4,357,631 that the demultiplexers 19 and 20 and the delay circuits 8 and 11 are made common and thereby utilized in time sharing manner.

As described above, it is well-known in the prior art that through the use of the transversal filter, the ghost signal can be cancelled out at the video signal stage.

By the way, in the conventional ghost cancelling circuit shown in FIG. 4, the switches 21 ($21_1$ to $21_n$) and 22 ($22_1$ to $22_n$), the analog accumulative adder-type memory circuits 24 ($24_1$ to $24_n$) and 25 ($25_1$ to $25_n$) and the weighting circuits 9 ($9_1$ to $9_n$) and 12 ($12_1$ to $12_m$) are arranged as, for example, shown in FIG. 5. In the figure, the signal from the demultiplexer 20 is supplied through transistors, $Q_1$ and $Q_2$ forming the switch 21 to the analog accumulative adder 24 consisting of a resistor R and a capacitor C. The voltage across this capacitor C is supplied through buffer-transistors, $Q_3$ and $Q_4$ to one transistor $Q_5$ of a differential circuit which forms the weighting circuit (multiplier)9. The other transistor $Q_6$ in this differential circuit is supplied with a predetermined fixed bias from a voltage source E. These transistors, $Q_5$ and $Q_6$ are respectively coupled to current paths of differential amplifiers, $A_1$ and $A_2$. The video signals of opposite polarities are respectively supplied to the differential amplifiers, $A_1$ and $A_2$ and the outputs from these differential amplifiers, $A_1$ and $A_2$ are compounded and then supplied to the delay circuit 8'.

In this circuit arrangement, the ghost level detecting signals and the ghost cancelling or imitating signals are of a bipolar or positive and negative polarities. While, the demultiplexer 20 and the analog accumulative adder 24 are both circuits of a unipolar or single polarity. Therefore, in the aforesaid circuit, the demultiplexer 20 and the analog accumulative adder 24 supply a predetermined DC bias to the signal to process the signal in response to whether the signal is positive or negative polarity against this DC bias and this DC bias is subtracted from the signal by the transistors, $Q_5$ and $Q_6$ so as to carry out the weighting operation.

Now, let us consider the time when the power is applied to the aforesaid ghost cancelling circuit. Although the voltage source E is risen at the same instant the power source is turned on, the capacitor C of the analog accumulative adder 24 is charged for only 100 nanoseconds in, for example, one vertical period of the cycle when the switch 21 is made on, so that the capacitor C requires much time to reach the aforesaid DC bias. Thus, the weighting circuit 9 reaches such a state that it is apparently supplied with a negative weighting function signal of a large value to thereby perform erroneous ghost cancelling operation, taking much time to finally converge to the correct ghost cancelling operation. Also, during this period, the significantly deteriorated picture is reproduced.

OBJECTS AND SUMMARY OF THE INVENTION

Accordingly, it is an object of this invention to provide a ghost cancelling system which can obviate the aforesaid defects inherent in the prior art ghost cancelling system.

Another object of this invention is to provide a ghost cancelling system of simple arrangement capable of immediately activating analog accumulative adders to enable the quick convergence of the ghost cancelling operation.

Further object of this invention is to provide a ghost cancelling system which is free from the erroneous ghost cancelling operation, ensuring the prevention of a deteriorated picture.

According to an aspect of the present invention, there is provided a ghost cancelling system comprising:
(A) signal input means for receiving an input signal which includes desired and ghost signals;
(B) transversal filter means connected to said signal input means and responsive to said desired signal for forming a waveform corresponding to said ghost signal, said transversal filter means including a weighting circuit and memory means having a storage capacitor for storing a weighting function for said weighting circuit;
(C) subtracting means connected between said signal input means and said transversal filter means for subtracting an output of said transversal filter means from said input signal;
(D) a ghost detector connected between the output terminal of said subtracting means and said memory means for detecting a level of said ghost signal to control said memory means such that the weighting function changes in response to the detected level;

(E) signal output means connected to the output terminal of said subtracting means; power responsive means for detecting the time when a power switch is turned on; and activating means connected between said power responsive means and said storage capacitor for charging the latter during a predetermined period when said power switch is turned on.

The other objects, features and advantages of the present invention will become apparent from the following description taken in conjunction with the accompanying drawings through which the like references designate the same elements and parts.

BRIEF DESCRIPTION OF THE DRAWINGS

FIG. 2 and FIGS. 3A and 3B are respectively waveform diagrams useful for the explanation thereof;

FIG. 5 is a schematic diagram showing a main part of the system shown in FIG. 4;

DESCRIPTION OF THE PREFERRED EMBODIMENT

Figure 1:
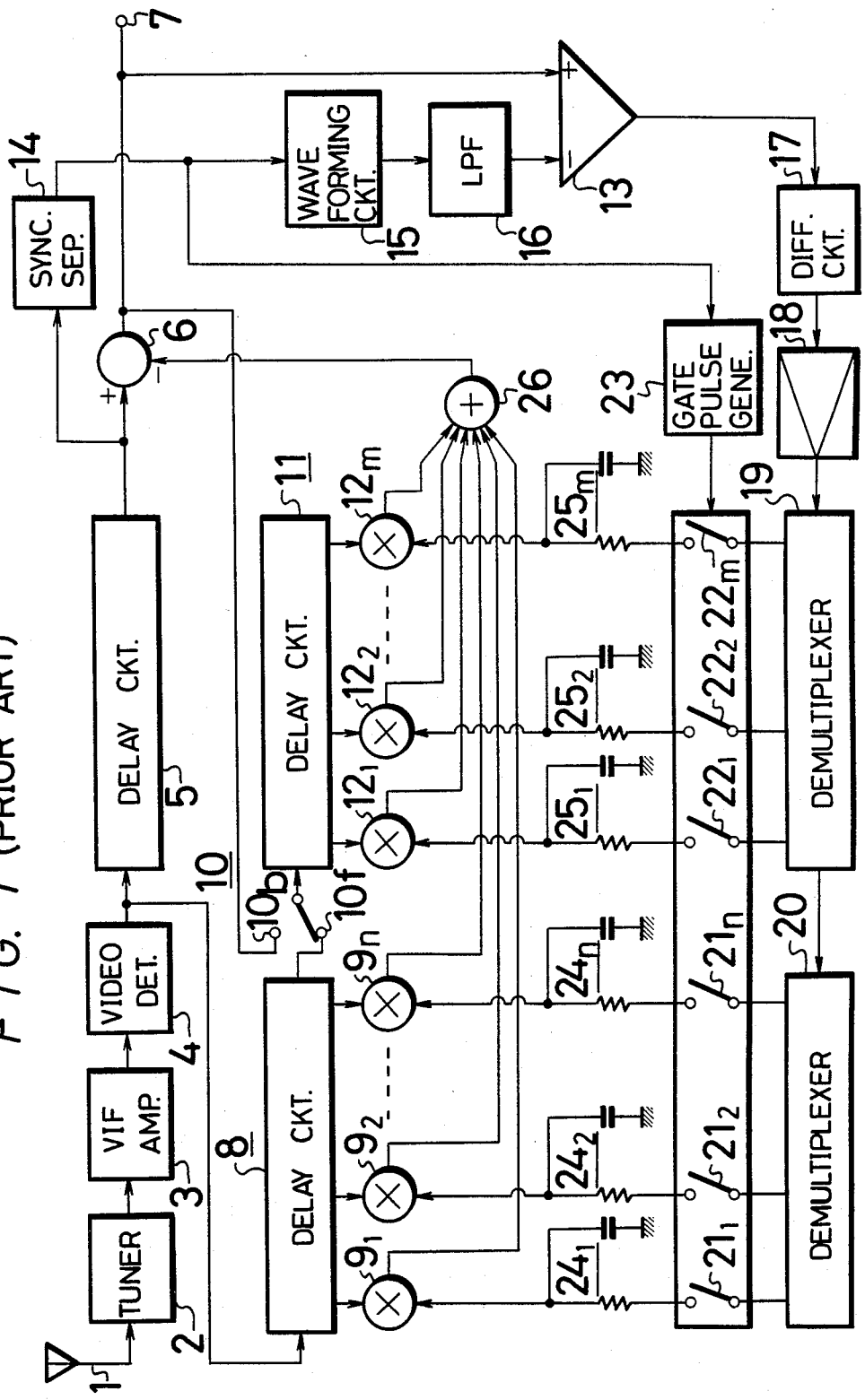
FIG. 1 is a schematic diagram showing an example of a conventional ghost cancelling system with a so-called output-adding type transversal filter.

Referring to the drawings, an embodiment of a ghost cancelling system according to this invention will be described hereinafter.

Figure 6:
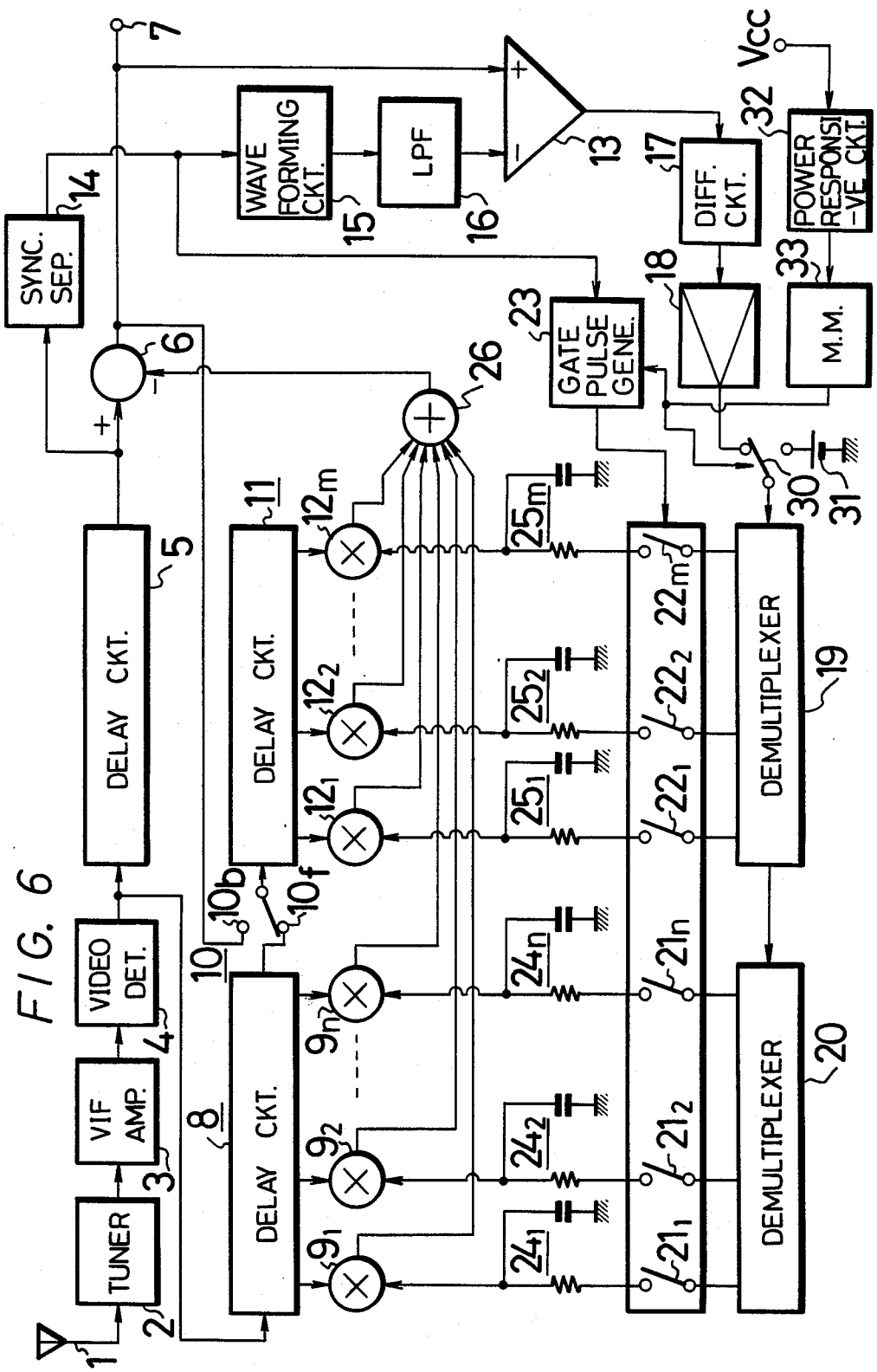
FIG. 6 is a schematic diagram showing an embodiment of a ghost cancelling system according to the present invention.

FIG. 6 shows an example of the ghost cancelling system according to this invention, and in the illustrative example of FIG. 6, an output-adding type transversal filter same as that of FIG. 1 is employed.

In FIG. 6, between the amplifier 18 and the demultiplexer 19 is connected a change-over switch 30, and one fixed contact of this change-over switch 30 is connected to the amplifier 18 and the other fixed contact thereof is connected to a voltage source 31. There is further provided a power responsive circuit 32 for detecting whether or not the power source is turned on, and the detected signal therefrom is supplied to a monostable multivibrator 33 which then generates an activating signal during a predetermined period from the power source being turned on. By this activating signal, the change-over switch 30 is changed in position to the side of the voltage source 31 and the gate pulse generator 23 is controlled to thereby turn the switches $21_1$ to $22_m$ on during this period, respectively.

In this circuitry, during the predetermined period from the power source being made on, the change-over switch 30 is changed over to permit a predetermined voltage to be supplied to the demultiplexers 19 and 20 and also to make the switches $21_1$ to $22_m$ on so that this voltage is continuously supplied to the analog accumulative adders, $24_1$ to $25_m$. Thus, the analog accumulative adders, $24_1$ to $25_m$ are charged up rapidly to reach a predetermined DC bias in quite a short time period. In this case, the voltage of the voltage source 31 is preferably selected as $E+2V_{BE}$ considering the base-emitter voltages of the transistors, $Q_3$ and $Q_4$ as, for example, shown in FIG. 5. Thereafter, the change-over switch 30 is changed in position to the side of the amplifier 18 and the switches, $21_1$ to $22_m$ are all made on with a predetermined gate pulse thus ghost being cancelled out satisfactorily.

As stated above, the ghost cancelling operation is performed. According to this invention, since when the power source is turned on, the charging current is supplied to the analog accumulative adders, $24_1$ to $25_m$ to make the charging potential thereof equal to the DC bias value, upon starting the ghost cancelling operation, the system can be operated with the reset state of no ghost and the subsequent ghost cancelling operation is performed rapidly and further the erroneous ghost cancelling operation is not performed so that the ghost cancelling operation can be converged in quite a short time period. Moreover, it is avoided that any quite deteriorated picture is reproduced on the picture screen. The results of experiment reveal that a converging time of several minutes is necessary for the conventional ghost cancelling operation after the power source is made on can be reduced to two seconds.

Figure 7:
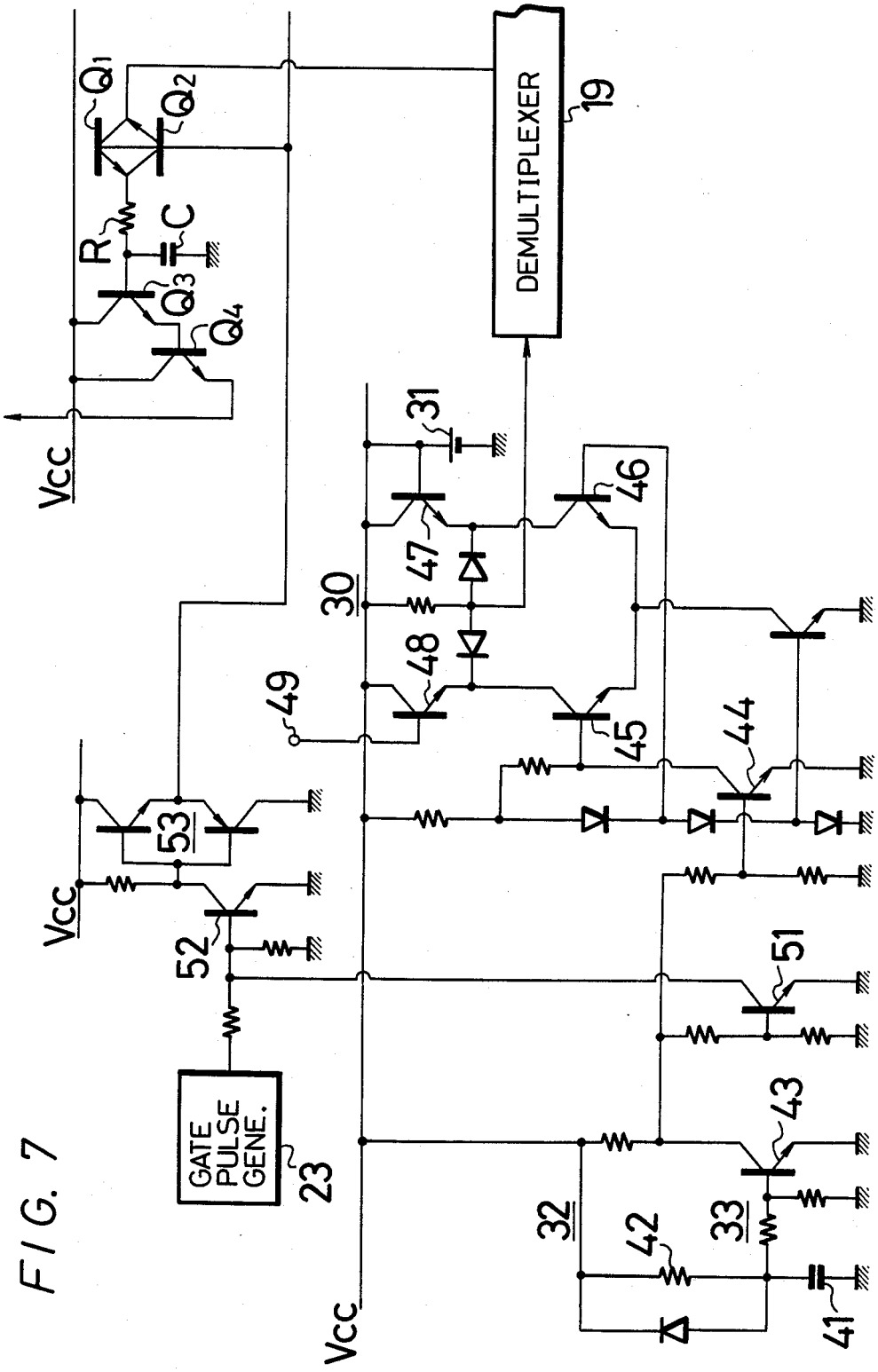
FIG. 7 is a connection diagram showing an example of practical circuit of part of the ghost cancelling system of the invention shown in FIG. 6.

FIG. 7 shows a practical example of part of the ghost cancelling circuit of FIG. 6. In the figure, the right and left arrangements in the circuitry are reversed relative to those of FIG. 6.

In FIG. 7, when the power source is made on and hence the power source voltage $V_{cc}$ rises up, in accordance with the time constant determined by a capacitor 41 and a resistor 42, the base voltage of a transistor 43 rises up. But the transistor 43 is off until the base voltage thereof reaches the predetermined voltage. During the period through which the transistor 43 is off, the collector voltage of the transistor 43 is supplied to a transistor 44 so that this transistor 44 is made on. In the period during which the transistor 44 is on, a transistor 45 is made off but a transistor 46 is made on. Thus, the voltage of the voltage source 31 is applied to the demultiplexer 19 through a transistor 47. Since the output terminal of the amplifier 18 in FIG. 6 corresponds to a terminal 49 of FIG. 7, when the transistor 43 is made on after the predetermined time as described above elapses, the transistor 44 becomes off, that 45 on and that 46 off. Thus, through a transistor 48 the ghost level detecting signal from the terminal 49 is supplied to the demultiplexer 19.

In the period during which the transistor 43 is off, transistor 51 is made on and that 52 off so that the positive voltage is supplied through a single-ended push pull (SEPP) circuit 53 to the transistors $Q_1$ and $Q_2$ to turn the switches 21 and 22 on. When the transistor 43 is made on, the transistor 51 is made off. Thus, the signal from the gate pulse generator 23 is supplied to the transistors, $Q_1$ and $Q_2$.

Thereby, during the predetermined period from the power source being turned on, the predetermined voltage is supplied to the demultiplexers 19 and 20 so that the switches, $21_1$ to $22_m$ are turned on to permit the charging currents to be supplied to the analog accumulative adders, $24_1$ to $25_m$.

In another interval other than the ghost level detecting interval, since the signal of relatively high level which results from differentiating an ordinary video signal is supplied thereto from the amplifier 18, it is possible in the aforesaid circuitry that the change-over switch 30 and the voltage source 31 may be omitted but only the switches 21 and 22 may be made on during the predetermined period from the power source is made on.

Figure 4:
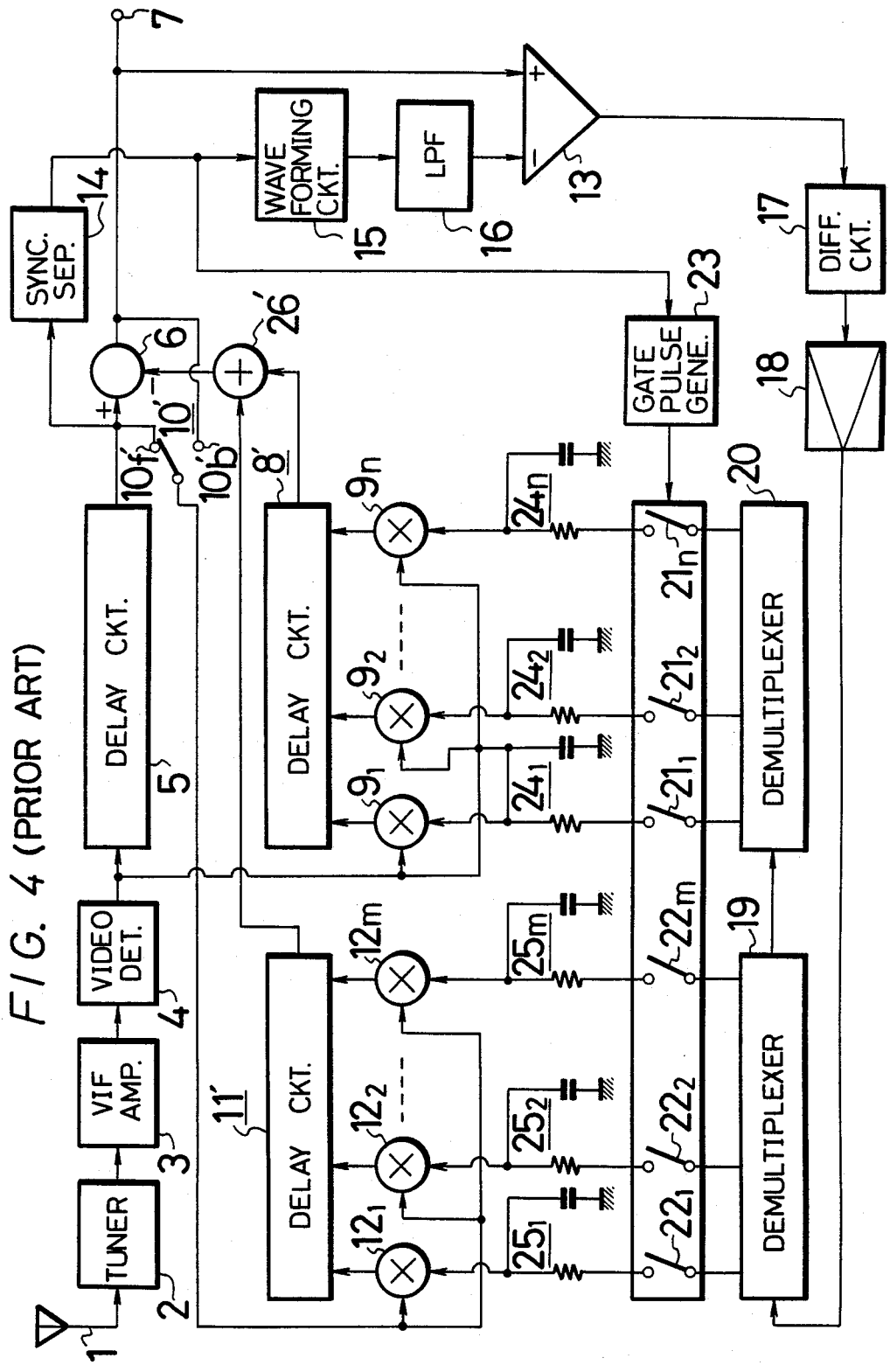
FIG. 4 is a schematic diagram showing another example of a conventional ghost cancelling system with a so-called input-adding type transversal filter.

While the example of FIG. 6 illustrates that the present invention is applied to the prior art circuitry of FIG. 1 which employs the output-adding type transversal filter, it is obvious that this invention can also be applied to the prior art circuitry of FIG. 4 employing the input-adding type transversal filter with the same effect, so this will not be described.

While all the illustrative examples of FIGS. 1, 4 and 6 include the pre-ghost cancelling circuit, it is apparent that this invention can be applied to the circuitry equipped with the delay-ghost cancelling circuit alone instead of the pre-ghost cancelling circuit.

In addition, it is normal that the pre-ghost canceller is not provided. The pre-ghost canceller is required only when the electric field intensity is intensive and the television signal is directly supplied to the tuner 2 without passing through the antenna 1 so that the pre-ghost signal appears before the desired signal. Therefore, it is possible to remove the pre-ghost cancelling transversal filters, 8, $9_1$ to $9_n$, $24_1$ to $24_m$, $21_1$ to $21_n$ and 20 and the delay circuit 5 from the circuit arrangements of FIGS. 1, 4 and 6.

The above description is given on a single preferred embodiment of the invention, but it will be apparent that many modifications and variations could be effected by one skilled in the art without departing from the spirits or scope of the novel concepts of the invention, so that the scope of the invention should be determined by the appended claims only.

We claim as our invention:

1. A ghost cancelling system comprising:
   (A) signal input means for receiving an input signal which includes desired and ghost signals;
   (B) transversal filter means connected to said signal input means and responsive to said desired signal for forming a waveform corresponding to said ghost signal, said transversal filter means including a weighting circuit and memory means having a storage capacitor for storing a weighting function for said weighting circuit;
   (C) subtracting means connected between said signal input means and said transversal filter means for subtracting an output of said transversal filter means from said input signal;
   (D) a ghost detector connected between the output terminal of said subtracting means and said memory means for detecting a level of said ghost signal to control said memory means such that the weighting function changes in response to the detected level;
   (E) signal output means connected to the output terminal of said subtracting means; power responsive means for detecting the time when a power switch is turned on; and activating means connected between said power responsive means and said storage capacitor for charging the latter during a predetermined period when said power switch is turned on.

2. A ghost cancelling system according to claim 1, wherein said activating means comprising:
   a constant voltage source; and a switch controlled by said power responsive means for connecting said constant voltage source to said storage capacitor.

3. A ghost cancelling system according to claim 1, wherein said transversal filter is connected between an output and one input of said subtracting means, and the signal input means is connected to the other input terminal of said subtracting means.

4. A ghost cancelling system according to claim 1, wherein said transversal filter means is connected between said signal input means and one input terminal of said subtracting means, and said signal input means is connected to the other input terminal of said subtracting means.

5. A ghost cancelling system according to claim 1, wherein said memory means is formed as an analog accumulative adder comprising said storage capacitor and switching means for connecting said storage capacitor to said ghost detector through a resistor during a predetermined short period in a vertical interval.

6. A ghost cancelling system according to claim 5, wherein said activating means activates said switching means such that said storage capacitor is connected to a constant voltage source through said switching means during said predetermined period when said power switch is turned on.

7. A ghost cancelling system according to claim 5, wherein said activating means activates said switching means such that said storage capacitor is connected to said ghost detector during said predetermined period when said power switch is turned on.

* * * * *